(12) United States Patent
Morse et al.

(10) Patent No.: US 11,704,099 B1
(45) Date of Patent: Jul. 18, 2023

(54) DISCOVERING MATCHING CODE SEGMENTS ACCORDING TO INDEX AND COMPARATIVE SIMILARITY

(71) Applicant: Amazon Technologies, Inc., Seattle, WA (US)

(72) Inventors: Trevor Andrew Morse, Monroe, WA (US); Rama Krishna Sandeep Pokkunuri, Redmond, WA (US); Matthew Lee, Long Island City, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,528

(22) Filed: Mar. 31, 2022

(51) Int. Cl.
*G06F 8/40* (2018.01)
*G06F 8/41* (2018.01)
*G06F 8/75* (2018.01)

(52) U.S. Cl.
CPC .............. *G06F 8/425* (2013.01); *G06F 8/427* (2013.01); *G06F 8/751* (2013.01)

(58) Field of Classification Search
CPC ........................................................ G06F 8/40
See application file for complete search history.

(56) References Cited

U.S. PATENT DOCUMENTS

| | | | |
|---|---|---|---|
| 7,853,556 B2 | 12/2010 | Swaminathan et al. | |
| 8,972,372 B2 | 3/2015 | Elbaum et al. | |
| 10,423,594 B2 | 9/2019 | Olivier et al. | |
| 2009/0064091 A1* | 3/2009 | Tonkin | G06F 8/51 717/104 |
| 2010/0115620 A1* | 5/2010 | Aime | G06F 21/563 707/E17.032 |
| 2012/0089964 A1* | 4/2012 | Sawano | G06F 11/3672 717/124 |
| 2012/0143877 A1* | 6/2012 | Kumar | H04L 45/745 707/747 |
| 2015/0106111 A1* | 4/2015 | Gray | G06F 16/9535 705/2 |
| 2016/0292580 A1* | 10/2016 | Sullivan | G06Q 30/0242 |
| 2019/0079752 A1* | 3/2019 | Makkar | G06F 8/73 |

* cited by examiner

*Primary Examiner* — Jae U Jeon
(74) *Attorney, Agent, or Firm* — S. Scott Foster; Kowert, Hood, Munyon, Rankin & Goetzel, P.C.

(57) ABSTRACT

Code search is used to support various features. Code segments may be indexed using a code structure representation of the code segment. Code segments may be compared for similarity to identify a match with an input code segment using a comparison of logic trees generated for the input code segment and a stored code segment in an entry with a matching index value.

20 Claims, 9 Drawing Sheets

DISCOVERING MATCHING CODE SEGMENTS ACCORDING TO INDEX AND COMPARATIVE SIMILARITY

BACKGROUND

Programming languages offer developers, designers, and other users with the ability to precisely specify the operation of various hardware or software designs for many different applications. Given the wide variety of programming languages, these developers, designers, and other users may encounter or otherwise use code written in a programming language which may be less familiar to the developer. Code development tools offer developers, designers, and other users with different capabilities to improve code performance and identify errors, which may in the exemplary scenario described above, help to overcome a developer's lack of familiarity with a programming language (or an environment in which the programming language is deployed) so that high performing code may still be written.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for matching code sources according to index and comparative similarity are described herein. Programming languages, scripts, or other statements of code that can be used to execute, define, or perform various applications, systems, services, computing operations or other tasks in software and/or hardware. As new applications, systems, services, computing operations or other tasks are written or otherwise defined in code, the code may be stored for later use, updating, partial reuse, inspiration, examples, or various other use cases. As collections of stored code can grow quite large, techniques to search for similar code may be implemented. However, text-based searches that merely treat code as text may often fail to accurately identify desired code. In various embodiments, techniques for matching code sources according to index and comparative similarity may provide a technique for locating desired code according to its code structure and similarity to an input code segment that is a search parameter. Such techniques may provide for fast, efficient, and accurate code searches, which may improve the performance of a variety computer system applications that rely upon code searches. For example, as discussed in detail below with regard to FIGS. 2-5, a code attribution feature may be used to obtain useful metadata for similar code as part of performing code suggestions in a development tool.

Figure 1:
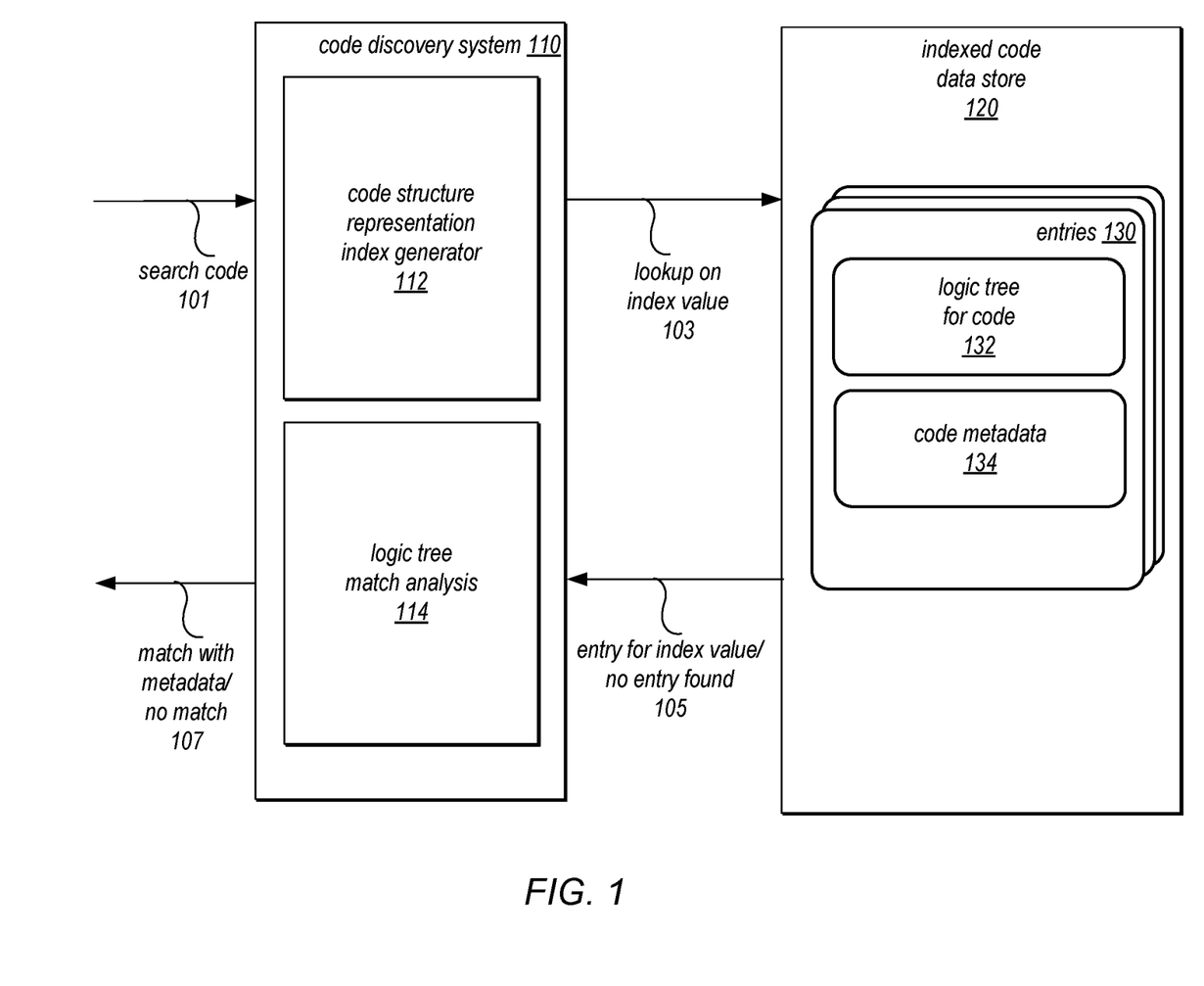
FIG. 1 is a logical block diagram illustrating discovering matching code sources according to index and comparative similarity, according to some embodiments.

FIG. 1 is a logical block diagram illustrating discovering matching code sources according to index and comparative similarity, according to some embodiments. Code discovery system 110 may provide access to an indexed code data store 120. Code discovery system 110 may be implemented to provide efficient search capabilities over a large set of code repositories. These code repositories may be indexed in code data store 120. Code data store 120 may store data in entries 130, which include a logic tree for code 132 and various code metadata 134, as discussed in detail below with regard to FIGS. 3-7.

Code discovery system 110 may be a standalone search system, which may provide discovery capabilities for various code repositories that grant access to and allow indexing of code by code discovery system, such as indexed code data store 120. For example, indexed code data store 120 may be a code repository that tracks code development, provides lineage and other code development history through code file branches, forks, or other development lineage, and/or operates as a configuration management system for larger collections of code for different applications. Code discovery system 110 may also be implemented as part of a service, such as a service offered by a provider network, like provider network 200 discussed below with regard to FIG. 2, to either provide a search capability or support other capabilities, such as a code suggestion feature in a code development service 210.

Code discovery system 110 may implement a search interface to receive search code 101. Code discovery system 110 may implement code structure representation index generator 112 to generate an index value used to perform a search on cod data store 120, as indicated at 103. For example, code structure representation may be generated from the search code 101 to generate a representation of the search code that preserves the structure of entities or symbols within search code 101. One example of a code structure representation may be an abstract syntax tree (AST). Code structure representation index generator 112 may generate an index value using the code structure representation, according to the various techniques discussed in detail below with regard to FIGS. 3, 4A, 6, and 7. Using a code structure representation, code structure similarity to identify a storage location for code may be used (as opposed to relying, for example, on text-based similarity).

An entity may be found or not using the index value, as indicated at 105. If found, then logic tree match analysis, as discussed in detail below with regard to FIGS. 3-7, maybe used to determine whether match has been found. In this way, structurally similar code may be further analyzed to determine if the logical structure of the code is also similar to the search code, allowing for matches to be found which are structurally and logically similar to a search code 101. If found, the match may be returned with metadata as indicated at 107. If not, no match may be indicated at 107.

Code discovery system 110 may drive the performance of many different features. For example, similar code search may be used to find alternative implementations for search code 101. As discussed in detail below with regard to FIGS. 2-5, code suggestions may rely upon code search to provide the source and other related information for code. Thus, code discovery system 110 may provide a powerful and efficient discovery tool to identify similar code segments across large number numbers of code files, objects, or repositories, improving the performance of code search systems using these techniques as well as systems that utilize these techniques to drive other features.

Please note that previous descriptions are not intended to be limiting, but are merely provided as an example of a code discovery system. Various other embodiments may also implement these techniques, as discussed in detail below.

The specification next includes a general description of a provider network, which may implement a code development service that implements matching code sources according to index and comparative similarity. Then various examples of a code development service are discussed, including different components/modules, or arrangements of components/module that may be employed as part of implementing a provider network. A number of different methods and techniques to implement matching code sources according to index and comparative similarity are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
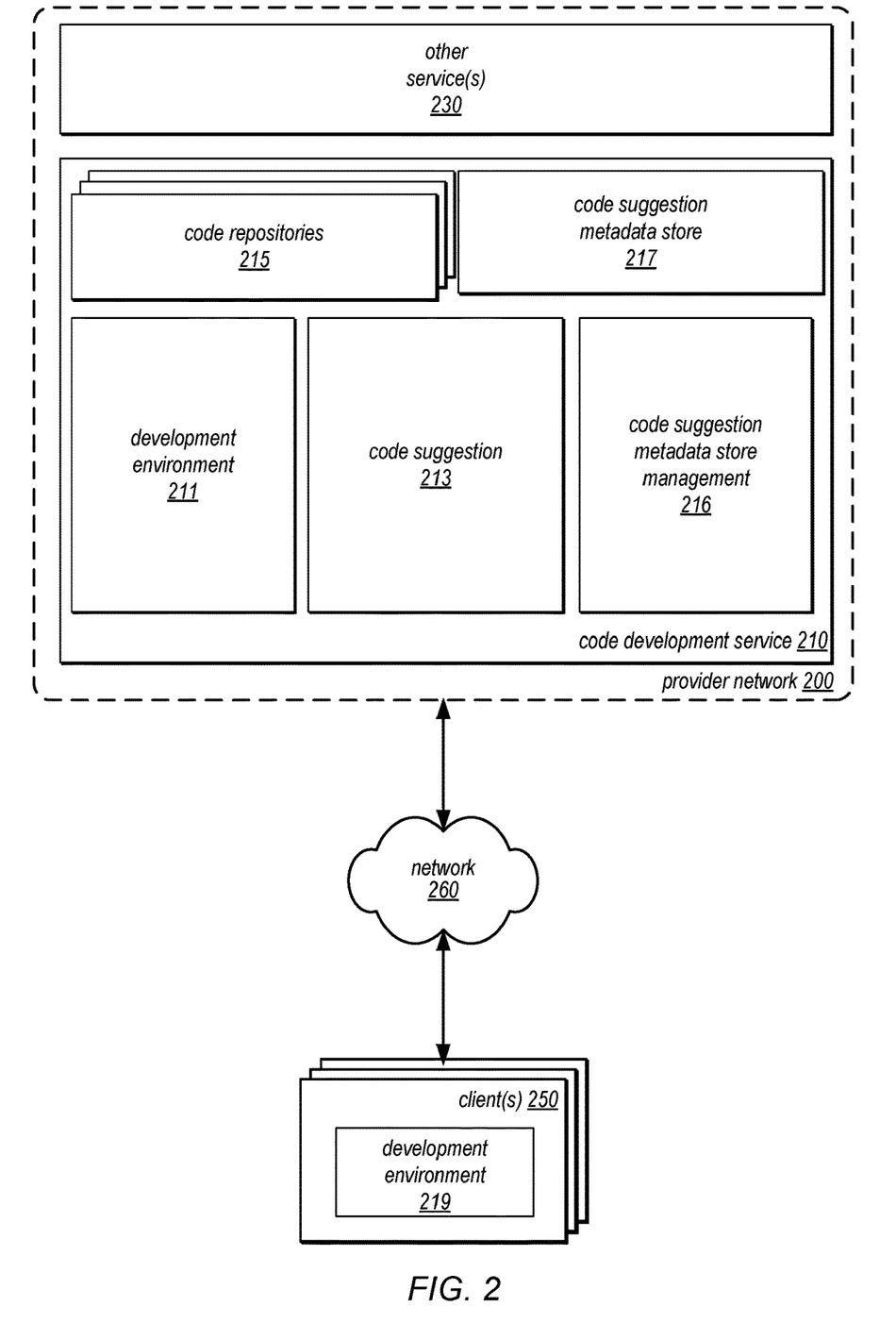
FIG. 2 is a logical block diagram illustrating a provider network that implements different services including a code development service that implements discovering matching code sources according to index and comparative similarity, according to some embodiments.

FIG. 2 is a logical block diagram illustrating a provider network that implements different services including a code development service that implements discovering matching code sources according to index and comparative similarity, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 210 may implement various computing resources or services, such as code development service 210, and other service(s) 230 which may be any other type of network based services, including various other types of storage (e.g., database service or an object storage service), compute, data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service 210 may implement development environment 211. Code development environment 211 may offer various code entry tools (e.g., text, diagram/graphics based application development) to specify, invoke, or otherwise write (or cause to be written) code for different hardware or software applications.

Code development service may implement code suggestion 213 to generate code suggestions based on text input in development environment 211 or 219 (e.g., utilizing a plug-in or other connection which may provide real-time analysis and suggestion of code as the code is entered into the development environment 211 or 219). Code suggestion 213 may use generative models, machine learning models such as Generative Adversarial Networks (GANs), trained to generate code suggestions. Generative models are often trained on a large corpus of data for a specific task. In the case of generating code recommendations, this corpus of (e.g., from code suggestion code repositories 215 or other code repositories used to train the generative model) can be comprised of code repositories or snippets from a variety of sources. Depending on the source or owner, the code may be subject to certain licenses which need to be attributed in any usage or reproduction. Since a generative model can sometimes reproduce verbatim, or close to verbatim, matches to the training data, metadata for attributing the original source may also need to be provided as part of the suggestion. Code suggestion metadata store management 216 may provide the ability to index code used to train code suggestions and to provide metadata for code suggestions from code metadata store 217 that may be provided, as discussed in detail below.

Code development service 210 may implement (or have access to) code repositories 215. Code repositories 215 may store various code files, objects, or other code that may be interacted with by various other features of code development service 210 (e.g., development environment 211 to write, build, compile, and/or test code). Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations, including operations of development environment 211. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request for code search or suggestion, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with code development service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
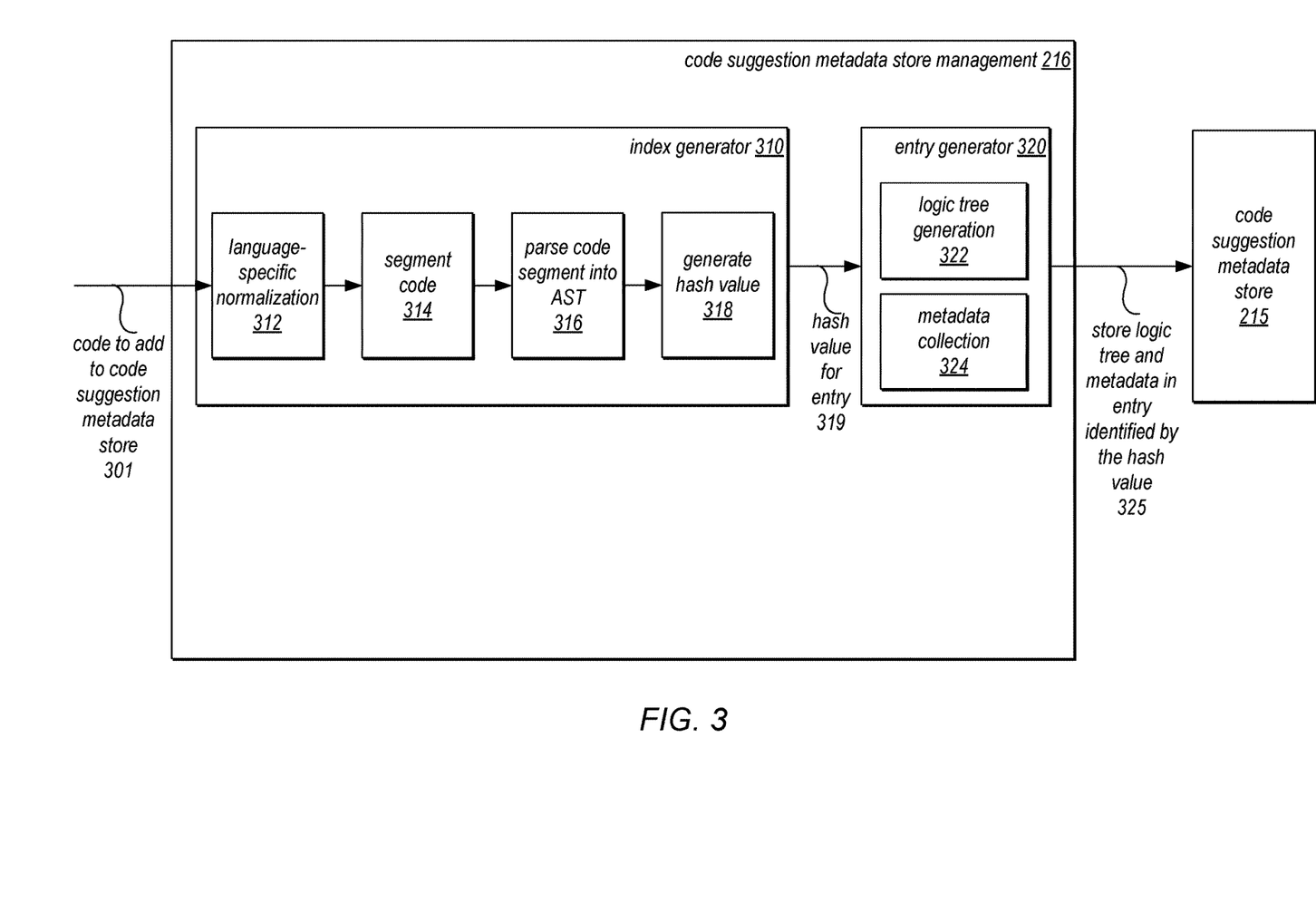
FIG. 3 is a logical block diagram illustrating a code metadata store management system that adds data to a code metadata store, according to some embodiments.

FIG. 3 is a logical block diagram illustrating a code metadata store management system that adds data to a code metadata store, according to some embodiments. Code suggestion metadata store management 216 may implement index generator 310 which may be used to generate an index value for code received to add to code suggestion metadata store 301, as discussed in detail below with regard to FIG. 7. Index generator 310 may include a language specific normalization feature 312, which may standardize the characters, remove extraneous spaces, or other normalization features for code to be added 301. Segment code 314 may divide received and normalized code into individual segments (e.g., lines, code blocks, or other groupings). Parse code segment into an AST 316 may be performed to generate from a code segment, a code structure representation, such as an AST, which may represent the code as abstracted symbols. These symbols in structure preserving representation may then be serialized or otherwise combined into a value (e.g., a string value) which generate hash value 318 may use to generate a hash value for the entry, as indicated at 319.

Entry generator 320 may be implemented by code suggestion metadata store management 216 to generate the content of an entry for the code segment at the location corresponding to the hash value for the entry 319. Logic tree generation 322 may tokenize a code segment by recognizing certain words, symbols, or characterizes (e.g., using regular expression searches) or delimiters (e.g., space character). Logic tree generation 322 may then generate logic trees may be generated from a tokenized (e.g., per word/symbol excluding some words or symbols that are not informative) version of a code segment, where nodes corresponding to the tokens are generated and linked to represent the logic of the code segment. Metadata collection 324 may gather (e.g., from a request or repository) the various metadata to store, such as license information, source information (e.g., source repository), style guidelines or other information. This information may be obtained from internal (e.g., to provider network 200) and/or external (e.g., to provider network 200) sources. In some embodiments, some metadata may be prompted via an interface to be added. As indicated at 325 the logic tree and metadata may be stored in the entry identified by the hash values at code suggestion metadata store 215.

Figure 4A:
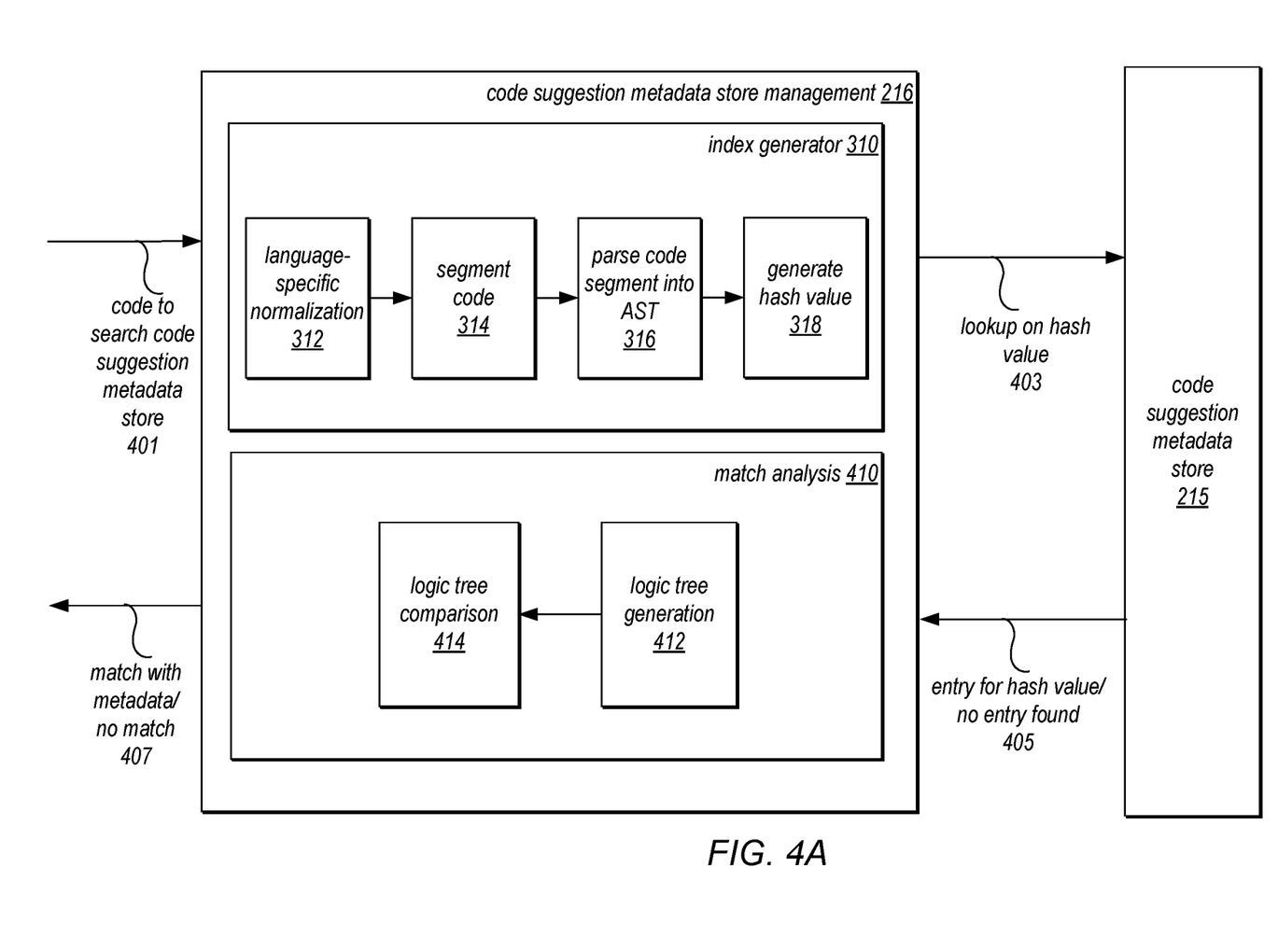
FIG. 4A is a logical block diagram illustrating a code metadata management system that searches for code segments in a code metadata store, according to some embodiments.

FIG. 4A is a logical block diagram illustrating a code metadata management system that searches for code segments in a code metadata store, according to some embodiments. Code suggestion metadata store management 216 implements index generator 310 for performing code searches specified at 401. Index generator may 310, which may be the same index generator used to add code to code suggestion metadata store 215 as discussed above with regard to FIG. 3, may include a language specific normalization feature 312, which may standardize the characterizes, remove extraneous spaces, or other normalization features. Segment code 314 may divide received code into individual segments (e.g., lines, code blocks, or other groupings). Parse code segment into an AST may be performed to generate from a code segment, an AST, which may represent the code as abstracted symbols. These symbols may then be serialized or otherwise combined into a value (e.g., a string value) which generate hash value 318 may use to generate a hash value for the entry, as indicated at 319.

Code suggestion metadata store management 216 may perform a lookup on the hash value, as indicated at 403, to code suggestion metadata store 215. If no entry is found (e.g., by receiving a response indicating that no entry for that index value exists), as may be indicated at 405, then no match is indicated at 407. If a match is found and the entry returned, as indicated at 405, the match analysis 410 may perform an analysis to determine whether a match exists, as discussed in detail below with regard to FIG. 6.

Match analysis 410 may implement logic tree generation 412 may tokenize a code segment by recognizing certain words, symbols, or characterizes (e.g., using regular expression searches) or delimiters (e.g., space character). Logic tree generation 412 may then generate logic trees from a tokenized (e.g., per word/symbol excluding some words or symbols that are not informative) version of a code segment, where nodes corresponding to the tokens are generated and linked to represent the logic of the code segment.

Logic tree comparison 414 may perform a comparison between a logic tree generated for the input code for search, provided at 403, and the logic tree for the found entry, provided at 405. Different matching schemes or criteria may be provided, such as discussed below with regard to FIG. 4B. If a match is found, then metadata for the match is provided, as indicated at 407. If not, then no match is indicated.

Figure 4B:
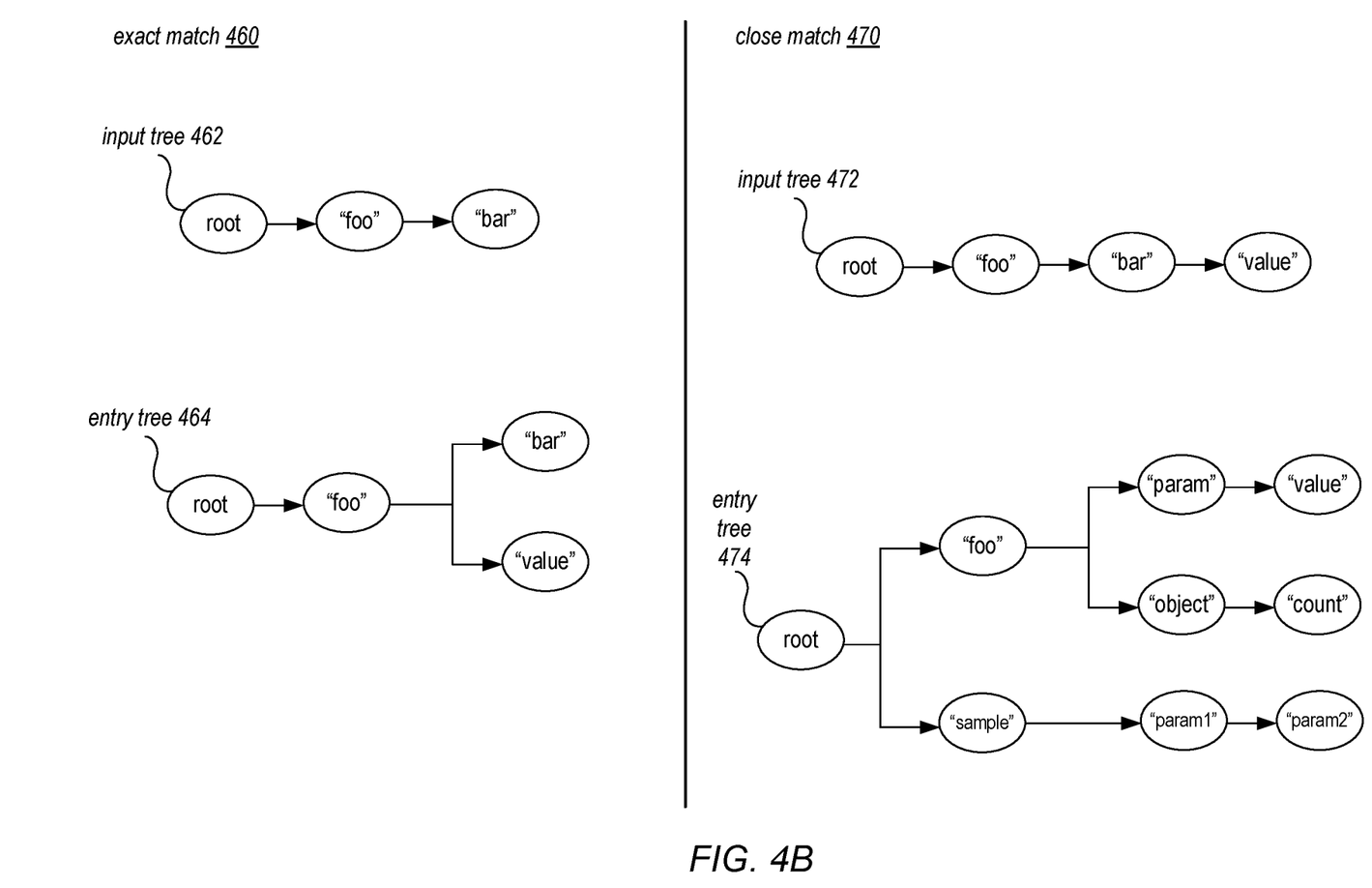
FIG. 4B illustrate example logic tree comparisons, according to some embodiments.

FIG. 4B illustrate example logic tree comparisons, according to some embodiments. An exact match 460 is one matching scheme that may be applied. An exact match scheme 460 may be exemplified by input tree 462, which is an example of the logic tree for code to search. The entry tree 464, includes matching nodes for each node in put tree, and thus may provide an exact match. Note that an additional node may not preclude the exact match.

Close match 470 provides another example of a matching scheme. Input tree 472 provides an example of a logic tree. When compared with entry tree 474 matches are identified for everything but "bar". A matching criteria, such a minimum threshold may be considered or maximum number of missing matches may be evaluated. In this case, only one node has no match, so 2 matches may satisfy the minimum, or one missing may satisfy the maximum missing criteria.

Figure 5:
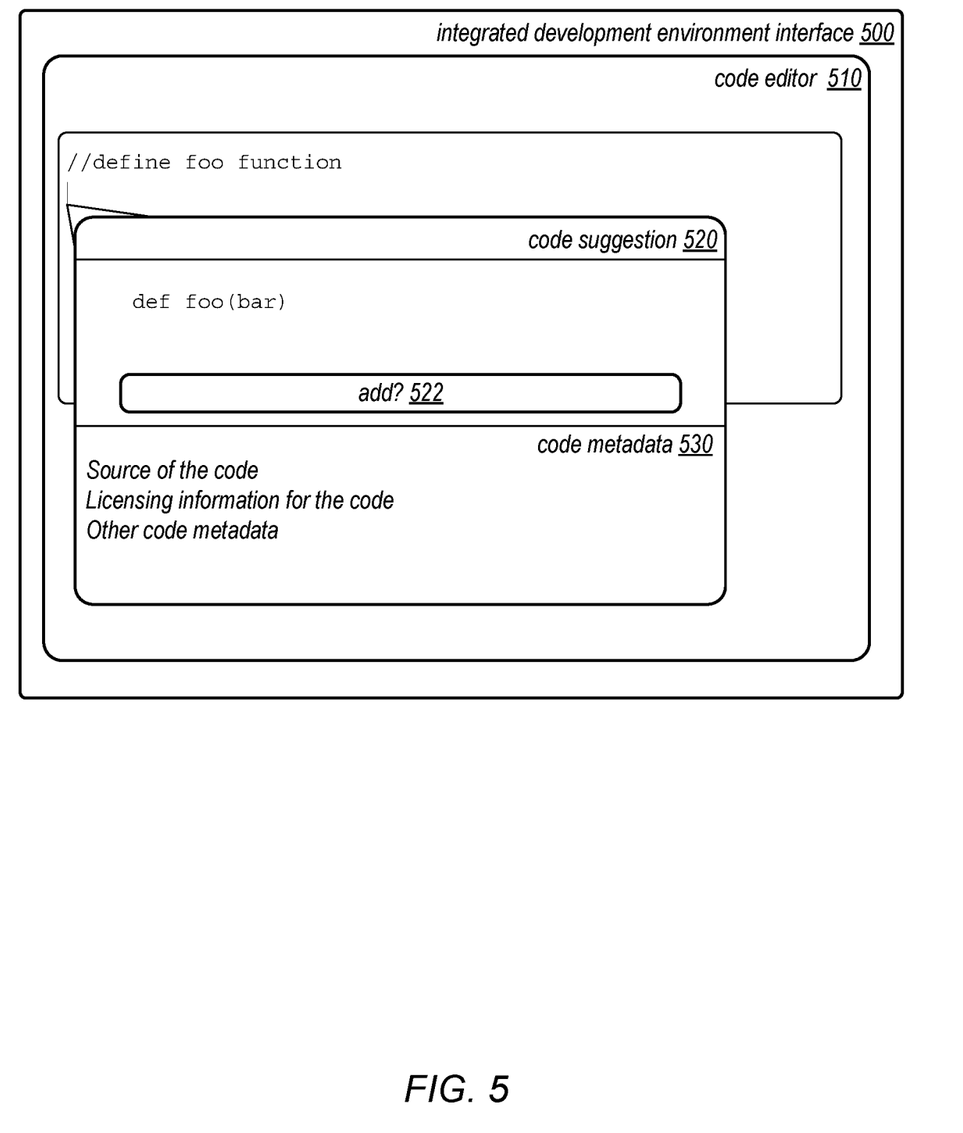
FIG. 5 is a logical block diagram illustrating an example interface of a development environment that utilizes metadata obtained from a code metadata store, according to some embodiments.

FIG. 5 is a logical block diagram illustrating an example interface of a development environment that utilizes metadata obtained from a code metadata store, according to some embodiments. Integrated development environment interface 500 may be implemented on a client of the code development service 210, as depicted in FIG. 2, or hosted as part of the code development service 210, as depicted in FIG. 2. Integrated development environment interface 500 may implement a code editor 510 (e.g., a text editor) which may allow a user to enter code in a programming language. The code suggestion feature 213 of code development service 210 may analyze the entered characters to determine a code suggestion 520, which may be displayed and added, as indicated at 522. As discussed above, a lookup may be performed on the code metadata store to obtain metadata associated with the code suggestion, if any. In this way code metadata 530 obtained using the indexing and similarity analyses discussed above may be provided as part of the display, including information such as the source of the code, licensing information for the code, and/or various other code metadata (e.g., style guidelines).

Figure 6:
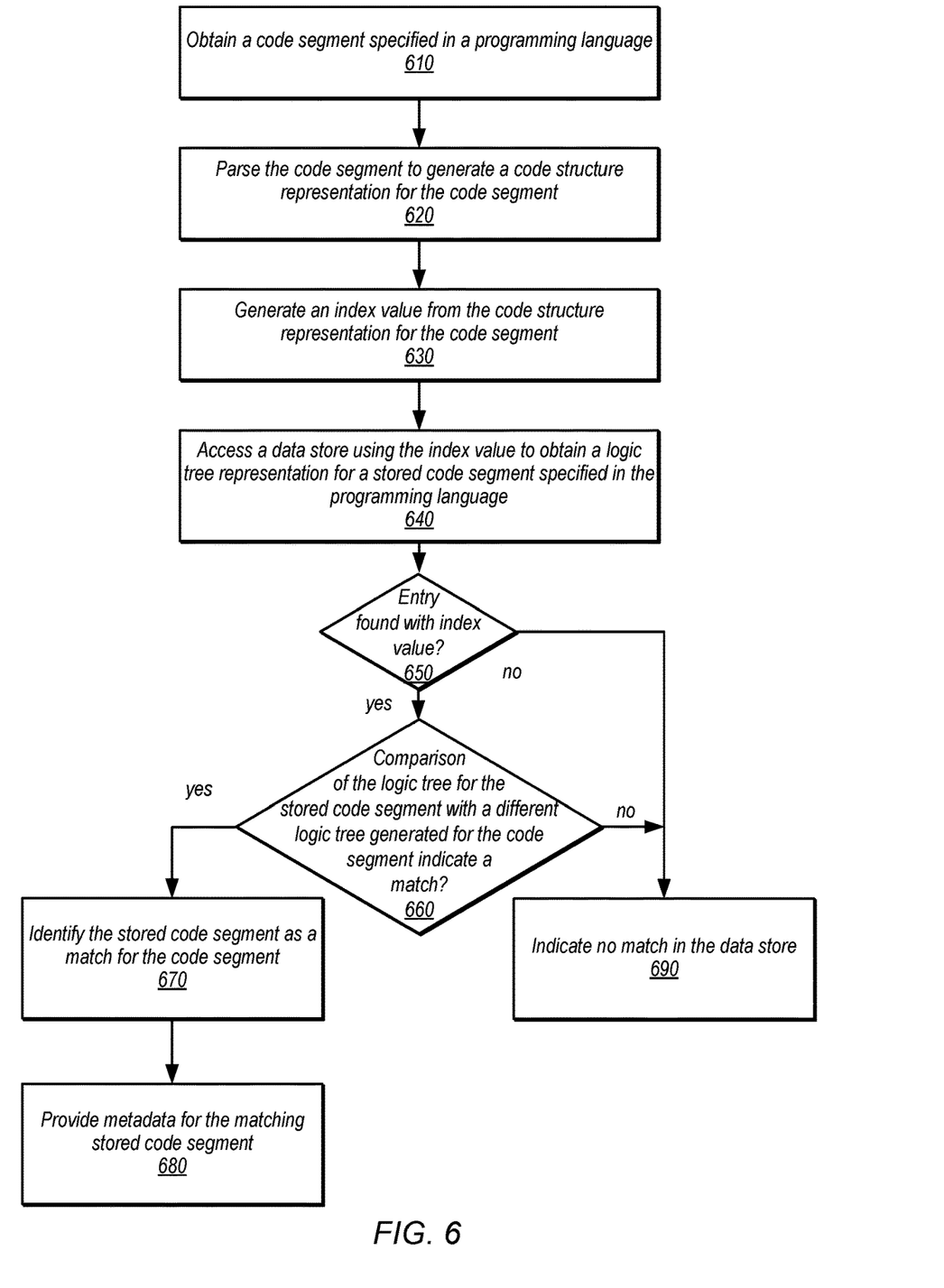
FIG. 6 is a high-level flowchart illustrating techniques and methods to implement discovering matching code sources according to index and comparative similarity, according to some embodiments.

The examples of discovering matching code sources according to index and comparative similarity discussed above with regard to FIGS. 2-5 have been given in regard to one example of a code development service. Various other types of code development tools, systems, or applications may implement these techniques. FIG. 6 is a high-level flowchart illustrating techniques and methods to implement discovering matching code sources according to index and comparative similarity, according to some embodiments. These techniques, as well as the techniques discussed below with regard to FIG. 7, may be implemented using various components of a provider network as described above with regard to FIGS. 2-5 or other types or systems implementing code development tools or other applications.

As indicated at 610, a code segment specified in a programming language may be obtained, in some embodiments. For example, the code segment may be received as part of a search request, suggested as part of a code suggestion feature, or generated or specified using various other techniques. The code segment may be received through various types of interfaces. In some embodiments, the code segment may be part of a larger group of code (e.g. a code file) which may extracted from the larger group of code. For example, the code segment may be a single line extracted from the code file (e.g., using end of line or other delimiters). A code segment may be a block of code (e.g., designated by code comment characters or grouping characters such as brackets, parenthesis, indentations, etc.).

As indicated at 620, the code segment may be parsed to generate a code representation structure. A code structure representation may preserve the structure of the symbol, elements, or other features of the code (e.g., using various kinds of data structures). One example of a code structure representation an Abstract Syntax Tree (AST), in some embodiments. Different programming languages may have different parsers which can be used to generate code representation structures.

As indicated at 630, an index value may be generated from the code structure representation for the code segment, in some embodiments. For example, the code structure representation may be transformed or serialized into a string (e.g., appending the various symbols together in an order indicated by the code structure representation) and then the string value may be input to a hash function which may generate an output value. Other indexing techniques using the code structure representation may be used in other embodiments.

As indicated at 640, a data store using the index value may be accessed to obtain a logic tree representation for a stored code segment specified in the same programming language, in some embodiments. In some embodiments, different data stores may be maintained for different programming languages so that searches for different code segments in different programming languages may be supported. If no entry is found with the index value, as indicated by the negative exit from 650, then indicate no match in the data store, as indicated at 690.

If an entry is found, then as indicated at 660, a comparison of a logic tree for the stored code segment in the entry with a logic tree generated for the obtained code segment may be performed to determine whether a match is found. As discussed above with regard to FIGS. 3-4B, logic trees may be generated from a tokenized (e.g., per word/symbol excluding some words or symbols that are not informative) version of a code segment, where nodes corresponding to the tokens are generated and linked to represent the logic of the code segment. Different matching thresholds or requirements may be implemented, such as an exact match where each node in the logic tree of the obtained code segment has to have a matching node in the logic tree of the stored code segment. Another matching requirement may be a minimum match threshold, where a number of matching nodes must meet or exceed the threshold number of the minimum match threshold. In some embodiments, the minimum match threshold may be specified via an interface that supports match configuration.

As indicated at 670, the stored code segment may be identified as a match for the code segment based on the comparison. In some embodiments, the matching code may be returned or an indication of the match may be returned. As indicated at 680, in some embodiments, metadata for the matching code segment may be provided. This metadata may be stored with the logic tree, as discussed above with regard to FIG. 1, in an entry in the data store. The metadata may be provided for various features, such as code attribution and licensing information as discussed above with regard to FIG. 5. As indicated at 690, an indication of no match in the data may be provided based on the comparison if, for instance, the matching criteria is not satisfied.

Figure 7:
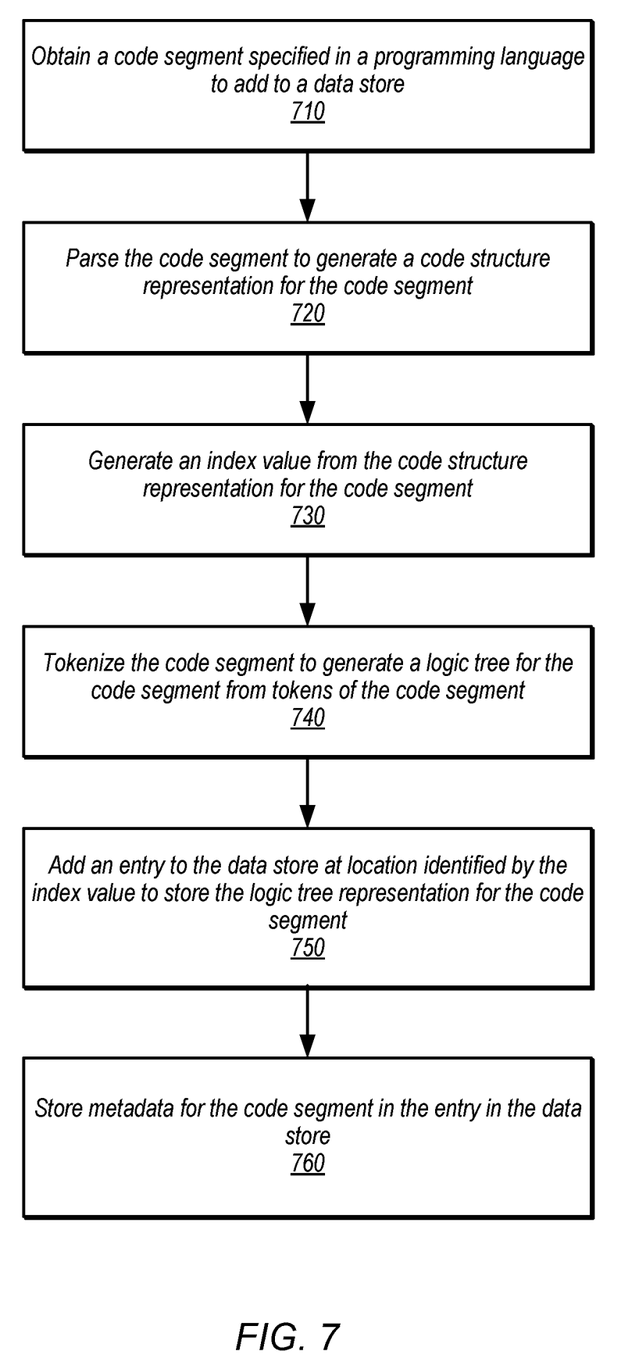
FIG. 7 is a high-level flowchart illustrating techniques and methods to add code to a data store for searching according to index and comparative similarity, according to some embodiments.

FIG. 7 is a high-level flowchart illustrating techniques and methods to add code to a data store for searching according to index and comparative similarity, according to some embodiments. As indicated at 710, a code segment specified in a programming language may be obtained, in some embodiments. For example, the code segment may be received as part of an ingestion request to add an new code corpus to an index for the programming language. The code segment may be received through various types of interfaces. In some embodiments, the code segment may be part of a larger group of code (e.g. a code file or collection of code files in a code corpus) which may extracted from the larger group of code. For example, the code segment may be a single line extracted from the code file (e.g., using end of line or other delimiters). A code segment may be a block of code (e.g., designated by code comment characters or grouping characters such as brackets, parenthesis, indentations, etc.).

As indicated at 720, the code segment may be parsed to generate a code structure representation. Different programming languages may have different parsers which can be used. As indicated at 730, an index value may be generated from the code structure representation for the code segment, in some embodiments. For example, the code structure representation may be transformed or serialized into a string (e.g., appending the various symbols together in an order indicated by the code structure representation) and then the string value may be input to a hash function which may generate an output value. Other indexing techniques using the code structure representation may be used in other embodiments.

As indicated at 740, the code segment may be tokenized to generate a logic tree for the code segment, in some embodiments. As discussed above with regard to FIGS. 3-4B, logic trees may be generated from a tokenized (e.g., per word/symbol excluding some words or symbols that are not informative) version of a code segment, where nodes corresponding to the tokens are generated and linked to represent the logic of the code segment.

As indicated at 750, an entry may be added to the data store at a location identified by the index value to store the logic tree representation for the code segment. As indicated at 760, metadata for the code segment may be stored in the entry in the data store.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 8:
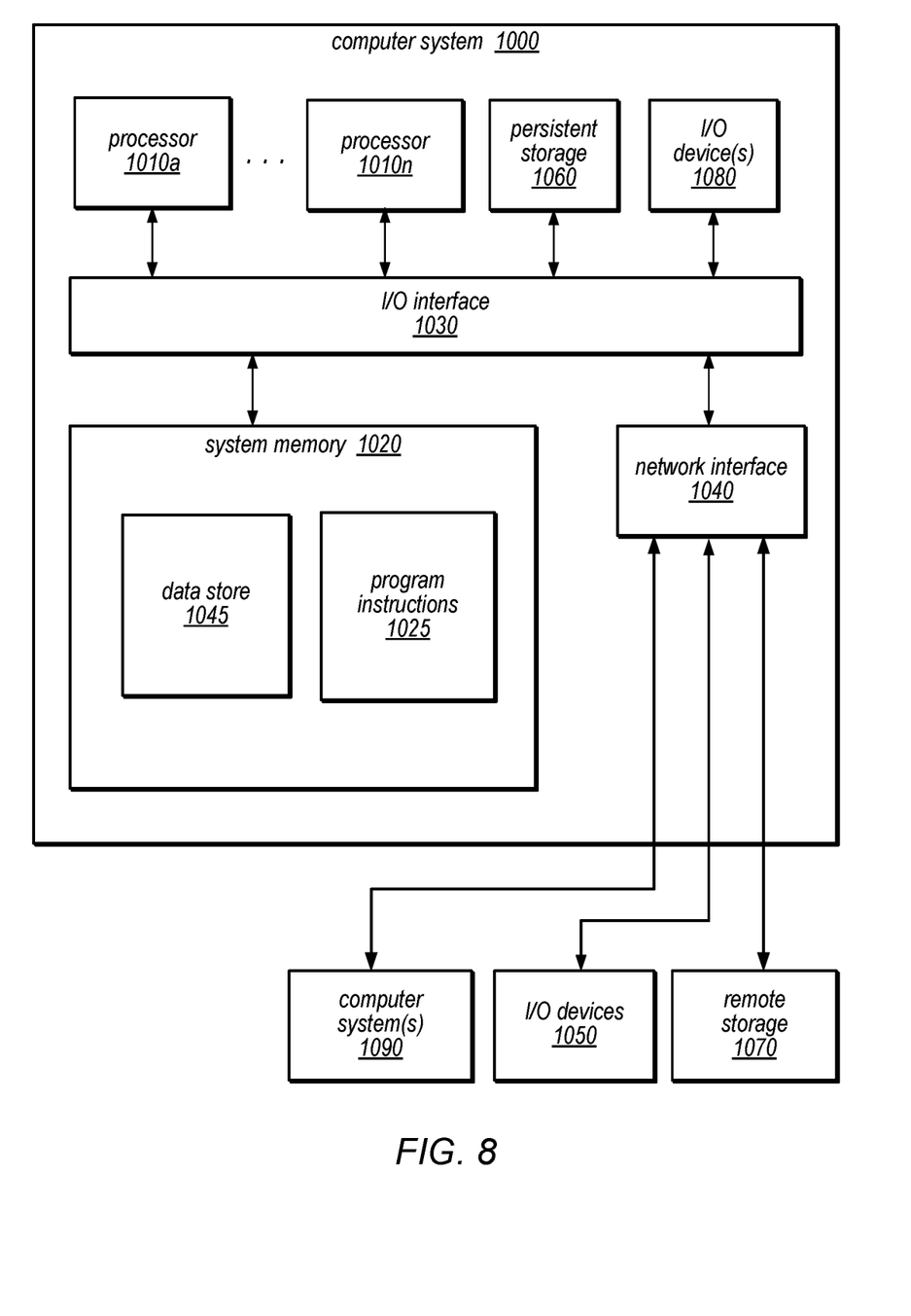
FIG. 8 is a block diagram illustrating an example computing system, according to some embodiments.

Discovering matching code sources according to index and comparative similarity as described herein may be executed on one or more computer systems, which may interact with various other devices. FIG. 8 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the ×86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as JavaTM byte-code, or in any other language such as C/C++, JavaTM, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, SolarisTM, MacOSTM, WindowsTM, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments, such as various techniques for discovering matching code sources according to index and comparative similarity. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising: at least one processor; and a memory, storing program instructions that when executed by the at least one processor, cause the at least one processor to implement:
   receiving a request for a match for a code segment specified in a programming language;
   parsing the code segment to generate a code structure representation for the code segment;
   applying a hash function to the code structure representation to generate an index value;
   accessing a data store using the index value to obtain a logic tree representation for a stored code segment specified in the programming language, wherein the logic tree representation is determined from respective tokens identified in the stored code segment;
   generating a different logic tree representation from different respective tokens identified from the code segment; and
   based on a comparison of the logic tree representation for the stored code segment with the different logic tree representation for the code segment, identifying the stored code segment as a match for the code segment.

2. The system of claim 1, wherein the memory stores further program instructions that cause the at least one processor to return metadata for the stored code segment obtained from an entry in the data store identified by the index value.

3. The system of claim 2, wherein the at least one processor and the memory are implemented as part of a code development service of a provider network, wherein the metadata for the stored code is provided to a development environment implemented on a client of the provider network.

4. The system of claim 1, wherein the memory stores further program instructions that cause the at least one processor to:
   receive a second code segment specified in the programming language to add to the data store;
   parse the second code segment to generate a second code structure representation for the second code segment;
   apply the hash function to the second code structure representation to generate a second index value; and
   add an entry in the data store for the second index value to store a second logic tree generated for the second code segment and metadata associated with the second code segment.

5. A method, comprising:
   obtaining a code segment specified in a programming language;
   parsing the code segment to generate a code structure representation for the code segment;
   generating an index value from the code structure representation for the code segment;
   accessing a data store using the index value to obtain a logic tree representation for a stored code segment specified in the programming language, wherein the logic tree representation is from respective tokens identified in the stored code segment;
   comparing the logic tree representation for the stored code segment with a different logic tree representation for the code segment generated from respective tokens identified from the code segment; and
   based on the comparing, identifying the stored code segment as a match for the code segment.

6. The method of claim 5, wherein the code segment is obtained as part of a request to search for the code segment in the data store and wherein the method further comprises sending metadata for the stored code segment obtained from an entry in the data store identified by the index value in response to the request to search for the code segment.

7. The method of claim 6, wherein the obtaining, the parsing, the generating, the accessing, the comparing, and the sending are performed by a code development service offered by a provider network, and wherein the metadata for the stored code is provided to a development environment hosted as part of the code development service.

8. The method of claim 5, wherein comparing the logic tree representation for the stored code segment with the different logic tree representation for the code segment generated from respective tokens identified from the code segment identifies matching ones for each of the nodes in the different logic tree representation in the logic tree representation.

9. The method of claim 5, wherein comparing the logic tree representation for the stored code segment with the different logic tree representation for the code segment generated from respective tokens identified from the code segment identifies a number of matching nodes in the different logic tree representation in the logic tree representation and wherein the identification of the stored code segment as the match for the code segment determines that the number of matching nodes exceeds a match threshold.

10. The method of claim 5, wherein the data store corresponds to the programming language and wherein the data store is one of a plurality of different data stores corresponding to different respective programming languages maintained for searching for code segments in the different respective programming languages.

11. The method of claim 5, further comprising:
   obtaining a second code segment specified in the programming language to add to the data store;
   parsing the second code segment to generate a second code structure representation for the second code segment;
   generating a second index value from apply the second code structure representation; and
   adding an entry in the data store for the second index value to store a second logic tree generated for the second code segment and metadata associated with the second code segment.

12. The method of claim 5, further comprising:
   obtaining a second code segment specified in the programming language;
   parsing the second code segment to generate a second code structure representation for the second code segment;
   generating a second index value from the second code structure representation for the second code segment;
   accessing the data store using the second index value to obtain a second logic tree representation for a second stored code segment specified in the programming language, wherein the second logic tree representation is from respective tokens identified in the second stored code segment;
   comparing the second logic tree representation for the stored code segment with a third logic tree representation for the second code segment generated from respective tokens identified from the second code segment; and
   based on the comparing, indicating that there is no match for the second code segment in the data store.

13. The method of claim 5, further comprising:
   obtaining a second code segment specified in the programming language;
   parsing the second code segment to generate a second code structure representation for the second code segment;
   generating a second index value from the second code structure representation for the second code segment;
   attempting to access the data store using the second index value to determine that an entry for the second index value does not exist in the data store;
   indicating that there is no match for the second code segment in the data store.

14. One or more non-transitory, computer-readable storage media, storing program instructions that when executed on or across one or more computing devices cause the one or more computing devices to implement:
   receiving a request for a match for a code segment specified in a programming language;
   parsing the code segment to generate a code structure representation for the code segment;
   generating an index value from the code structure representation for the code segment;
   accessing a data store using the index value to obtain a logic tree representation for a stored code segment specified in the programming language, wherein the logic tree representation is from respective tokens identified in the stored code segment;
   comparing the logic tree representation for the stored code segment with a different logic tree representation for the code segment generated from respective tokens identified from the code segment; and based on the comparing, identify the stored code segment as a match for the code segment.

15. The one or more non-transitory, computer-readable storage media of claim 14, storing further instructions that when executed on or across the one or more computing devices cause the one or more computing devices to further implement sending metadata for the stored code segment obtained from an entry in the data store identified by the index value in response to the request for the match for the code segment.

16. The one or more non-transitory, computer-readable storage media of claim 15, wherein the one or more computing devices are implemented as part of a code development service of a provider network, wherein the metadata for the stored code is provided to a development environment implemented on a client of the provider network.

17. The one or more non-transitory, computer-readable storage media of claim 14, wherein comparing the logic tree representation for the stored code segment with the different logic tree representation for the code segment generated from respective tokens identified from the code segment identifies a number of matching nodes in the different logic tree representation in the logic tree representation and wherein the identification of the stored code segment as the match for the code segment determines that the number of matching nodes exceeds a match threshold.

18. The one or more non-transitory, computer-readable storage media of claim 17, wherein the match threshold is specified according to a request that configures code segment matching.

19. The one or more non-transitory, computer-readable storage media of claim 14, storing further instructions that when executed on or across the one or more computing devices cause the one or more computing devices to further implement:

obtaining a second code segment specified in the programming language to add to the data store;
parsing the second code segment to generate a second code structure representation for the second code segment;
generating a second index value from apply the second code structure representation; and
adding an entry in the data store for the second index value to store a second logic tree generated for the second code segment and metadata associated with the second code segment.

20. The one or more non-transitory, computer-readable storage media of claim 14, storing further instructions that when executed on or across the one or more computing devices cause the one or more computing devices to further implement:

receiving a second request for a match for a second code segment specified in the programming language;
parsing the second code segment to generate a second code structure representation for the code segment;
generating a second index value from the second code structure representation for the second code segment;
accessing the data store using the index value to obtain a second logic tree representation for a second stored code segment specified in the programming language, wherein the second logic tree representation is from respective tokens identified in the second stored code segment;
comparing the logic tree representation for the second stored code segment with a third logic tree representation for the second code segment generated from respective tokens identified from the second code segment; and
based on the comparing, indicating that there is no match for the second code segment in the data store.

\* \* \* \* \*